United States Patent Office 3,266,140
Patented August 16, 1966

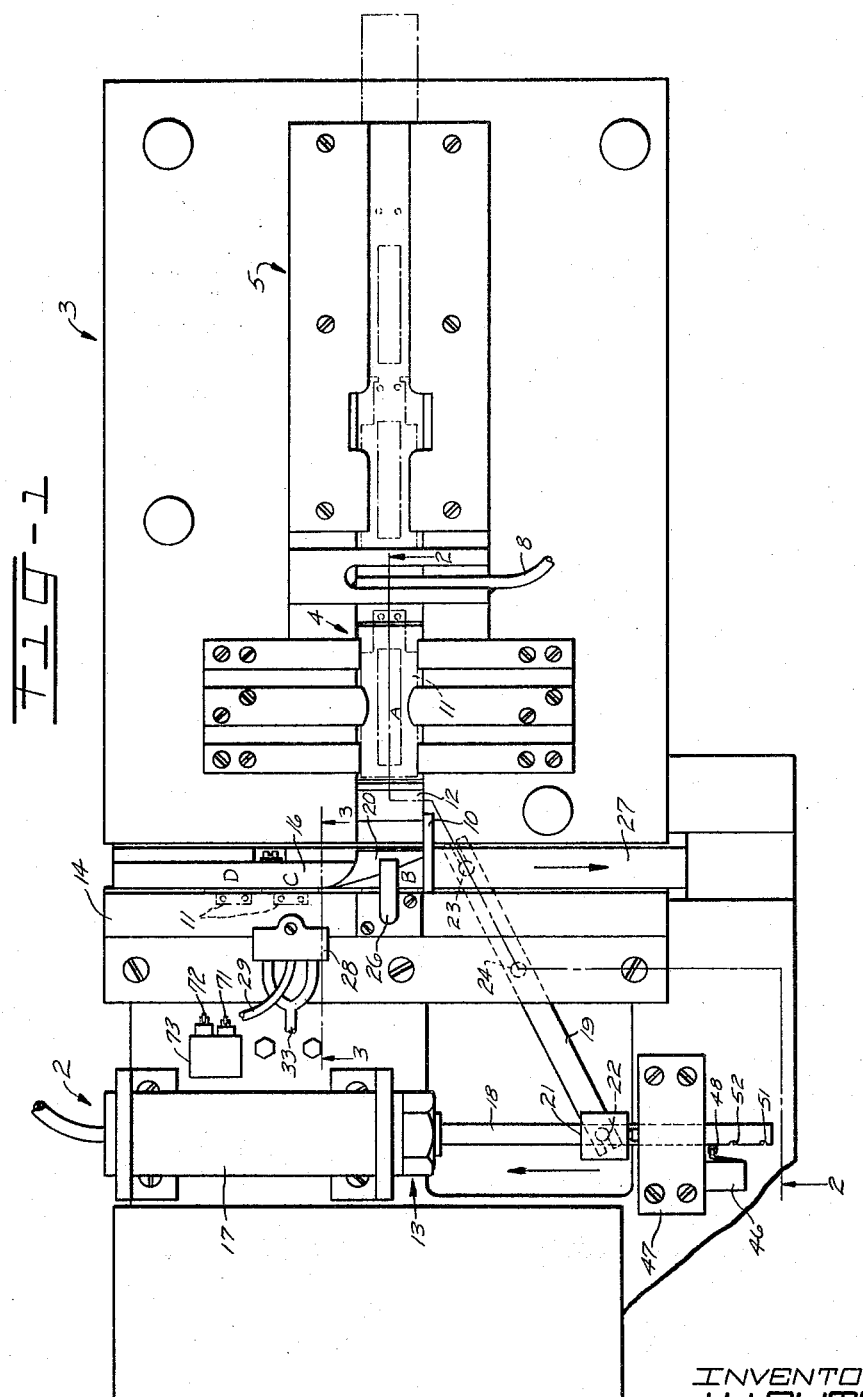

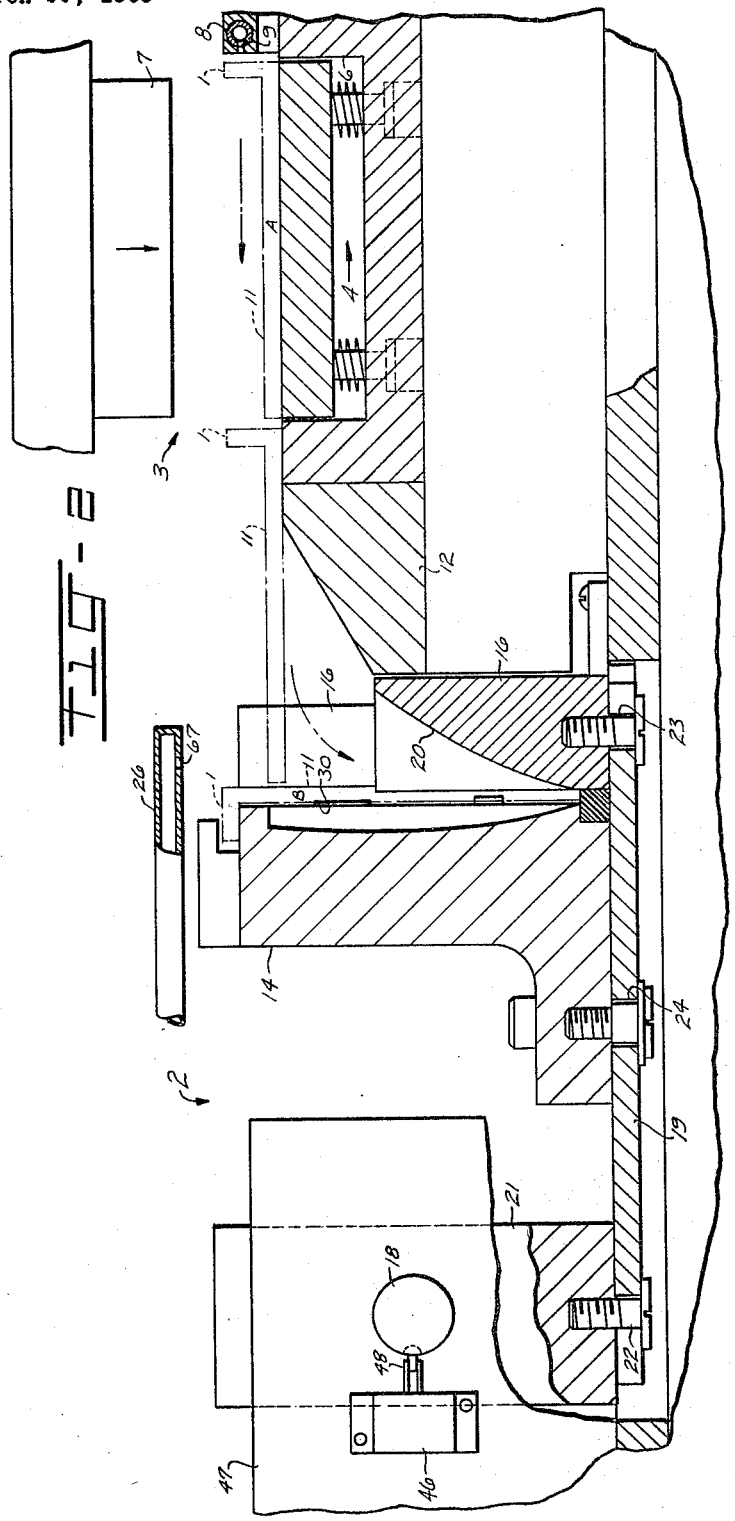

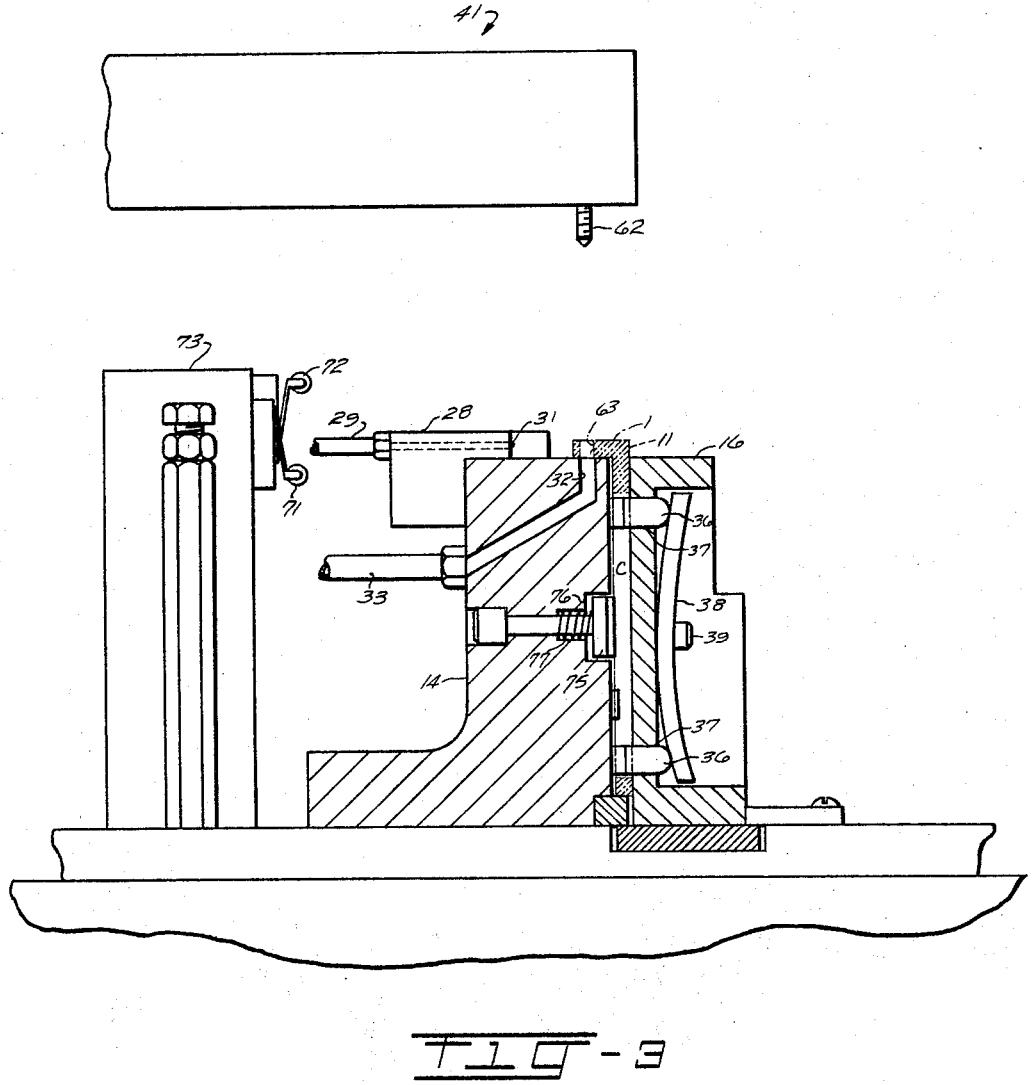

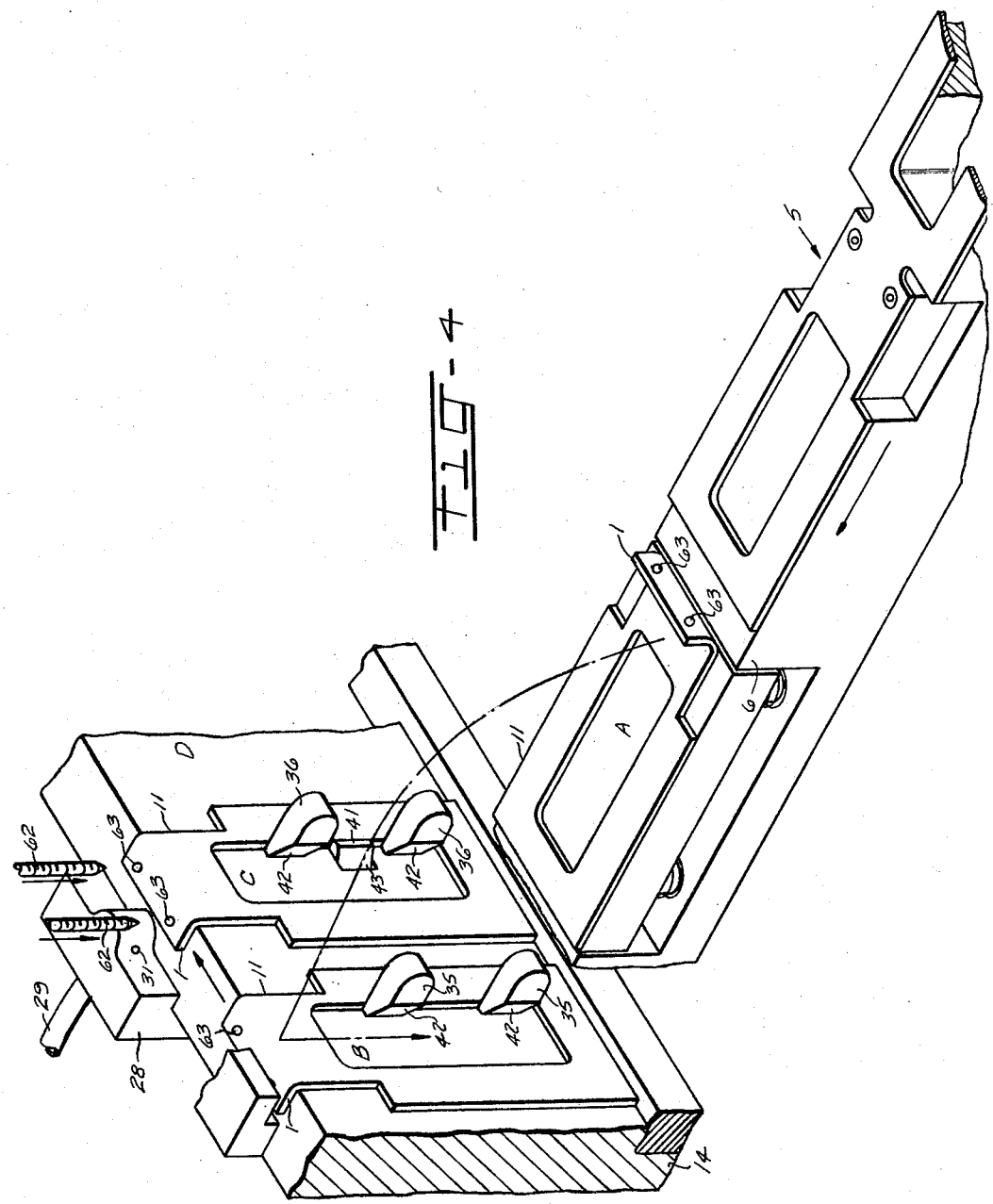

3,266,140
TRANSFER AND POSITIONING APPARATUS
Joachim H. Ohme, East Orange, and Arthur H. Werner, Wayne, N.J., assignors to Western Electric Company, Incorporated, New York, N.Y., a corporation of New York
Filed Mar. 11, 1963, Ser. No. 264,203
2 Claims. (Cl. 29—563)

This invention relates to apparatus for transferring and positioning articles and, particularly but not necessarily exclusively, to an apparatus of this nature which is peculiarly adaptable to incorporation in a substantially automated manufacturing process.

It is accordingly an object of this invention to provide an apparatus whereby articles under manufacture may be conveniently and expeditiously received from the site of one or more manufacturing operations, reoriented, transferred to the site of a further manufacturing operation, and properly positioned and maintained at the latter for the performance of the further manufacturing operation thereon.

A further object of the invention is the provision of an apparatus as stated above whereby the further manufacturing operation, formerly performed as a secondary and independent operation, may now be accomplished as an integral and synchronized step in a substantially automated manufacturing process with resultant increase in over-all process efficiency.

In a preferred embodiment herein disclosed, the invention will be seen to be disclosed in conjunction with a progressive punch and die and tapping assembly, and to comprise an apparatus for receiving articles of manufacture— as for example, relay cover guides—from the progressive punch and die and transferring and positioning the thusly received articles for operation thereon by the tapping assembly. The apparatus is aligned with and attached to the ejection side of the punch and die whereby articles ejected therefrom may be automatically fed to the apparatus wherein they are nested in a cam-shaped opening in a slidable transfer member and positioned thereby in a first position on a mounting member. Upon actuation by a signal from the related assemblies, the transfer member functions to transfer the articles to a second position for tapping on the mounting member, and returns to receive another article from the punch and die. An electrical control circuit and misfeed detector, both of which utilize movement responsive switch means, are provided to synchronize the operation of the apparatus with that of the punch and die and tapping assemblies and to immediately discontinue the operation of the latter upon any malfunction in the operation of the former.

Further objects and advantages of the invention will readily become apparent from the following specification taken in conjunction with the accompanying drawings wherein:

FIG. 1 is a plan view of the apparatus of the invention depicted in conjunction with a progressive punch and die assembly;

FIG. 2 is a sectional view taken along line 2—2 of FIG. 1;

FIG. 3 is a sectional view taken along line 3—3 of FIG. 1, and

FIG. 4 is an isometric view of a portion of the apparatus of FIG. 1.

Turning now to FIGS. 1 and 2, the apparatus is generally indicated at 2 and seen to be mounted adjacent a progressive punch and die assembly, generally indicated at 3. A stamping station 5 and a forming station 4 are included in the said assembly wtih the latter comprising a forming die 6 and a reciprocable punch 7 mounted thereabove in the depicted manner whereby lip portions 1 may be formed on cover guides 11 therewithin. Compressed air conduit 8 including discharge nozzle 9 is positioned adjacent the forming station and supplied compressed air from any convenient source to eject the relay cover guides 11 therefrom by a blast of air against lip portions 1, upon the completion of each stroke of the punch 7. Inclined guide block 12 is positioned adjacent the forming station as shown in FIG. 2, and functions to direct parts ejected therefrom into the apparatus.

With reference to FIG. 1, the apparatus 2 will be seen to comprise a slidable cam transfer member 16, a stationary mounting and guide block 14, and an air cylinder assembly 13. Included in turn in the air cylinder assembly 13 are double-acting air cylinder 17, connecting rod 18, and connecting rod connector block 21 fixedly mounted on the latter. Cam transfer member actuating lever 19 is pivotally mounted at 24 on the underside of the stationary mounting and guide block 14 with the opposite ends of the lever connected in fork fashion as shown to the connector block 21 and the slidable cam transfer member 16 at 22 and 23, respectively. By this arrangement, transverse movement of the connecting rod due to the action of air cylinder 17 will result, through the medium of connector block 21 and actuating lever 19, in corresponding but oppositely directed transverse movement of the slidable cam transfer member 16.

A compressed air conduit 26 including discharge nozzle 67, is positioned as shown above the mounting and guide block 14 and functions, when supplied with compressed air from any convenient source, to aid in the direction of cover guides 11 from inclined guide block 12 over cam surface 20 to nest in a substantially vertical position adjacent the side wall 30 of mounting and guide block 14 in the manner depicted in FIGS. 2 and 4. A guide plate 27 is positioned atop the mounting and guide block 14 immediately above a portion of cam surface 20 and functions, by virtue of the vertical wall 10 thereof, to aid in the proper direction of cover guides 11 from inclined guide block 12 over cam surface 20 to the vertical position of FIGS. 2 and 4.

Lubricating mist supply assembly 28 is similarly positioned atop the mounting and guide block 14 and includes oil mist discharge nozzles 31 and a non-illustrated oil supply reservoir contained therein, and compressed air conduit 29 connected thereto whereby a lubricating mist may be supplied to the vicinity of a relay cover guide maintained adjacent thereto in the position best depicted in FIG. 3 for purposes set forth in detail hereinbelow. Further included in the mounting and guide block and located therein directly below the lubricating mist supply assembly is a chip removal assembly comprising chip removal passage 32 formed in the block with the inlet end thereof located immediately below and in communication with holes 63 formed in the lipped portion of a relay cover guide 11 maintained thereover in the position depicted in FIG. 3. Forked vacuum line 33 is connected as shown to the opposite ends of the chip removal passages whereby reduced pressure conditions may be created in the latter for reasons set forth hereinbelow.

Turning now in greater detail to FIGS. 3 and 4, cover guide transfer pawls 35 and 36 will be seen to be mounted as depicted in FIG. 3 in holes 37 in the slidable cam transfer member 16 and spring-loaded therein to project therefrom toward the adjacent surface of the mounting and guide block 14 by the action of leaf spring 38 maintained thereagainst by bolt 39. FIG. 4 makes clear that there are two pairs of the pawls mounted in a side-by-side relationship. In FIG. 4, slidable cam transfer 16 is not shown for reasons of clarity. A similarly spring loaded cover guide holding pawl 41 is seen in FIG. 4 to be mounted within the mounting and guide block 14 and to project therefrom toward the adjacent surface of the slidable cam transfer member. As should be noted, the pawls are bevelled at 42 and 43, respectively, whereby the pawl pairs 35–35 and 36–36 of the slidable cam transfer member will be operative to move cover guides 11 in only one direction, i.e., from left to right in FIG. 4, while the pawl 41 of the stationary mounting and guide block 14 will be operative to prevent movement of the cover guides in only one direction, i.e., from right to left in FIG. 4. Thus, it may be readily appreciated that the slidable cam transfer member 16 will, as a result of its movement through one reciprocatory cycle and the resultant action of the pawls 35, be operative to grip and transfer cover guides from the position whereat the guides are first introduced to the apparatus from the punch and die, i.e., immediately below air discharge nozzle 27, to the various positions assumed by the guides during the progression thereof through the apparatus. It may be similarly appreciated that the pawl 41 of the stationary mounting and guide block 14 will be operative to maintain the cover guides immediately adjacent lubricating mist discharge nozzles 31 by preventing movement thereof in the direction followed by the slidable cam transfer member 16, i.e., from right to left in FIG. 4, at the beginning of a reciprocatory cycle thereof. A bevelled drag pad 75 is mounted as shown in FIG. 3 within notch 76 in the block 14 and spring loaded therein by the action of spring 77 to exert a frictional drag on cover guides transferred by the transfer member to the depicted position on the mounting block adjacent the lubricating mist supply assembly 28.

A tapping assembly 51 will be seen in FIGS. 3 and 4 to be reciprocably mounted above the mounting and guide block 14 and to include rotatable taps 62. The operation of this tapping assembly and of the punch and die are, of course, synchronized with the operation of the apparatus in the manner described hereinbelow so that the tapping assembly and punch and die reciprocate through one complete stroke for every stroke of the slidable transfer member 16. FIG. 4 reveals the tapping assembly to be so located that the center lines of the taps 62 are in alignment with the center lines of holes 63 of the cover guides whereby such holes may be effectively threaded by the rotation of the taps therewithin upon the downward movement of the tapping assembly in synchronization with the maintenance of cover guide 11 adjacent the lubricating mist discharge nozzles 31 by the action of pawl 41, drag pad 75 and the adjacent side wall of transfer member 16. It is, of course, the function of the previously described lubricating mist supply and vacuum chip removal assembly to supply lubrication to, and remove chips from, the interiors of the cover guide holes 63 during the performance of the threading operation therein.

Microswitches 71 and 72 are mounted as shown in FIGS. 1 and 3 upon mounting bracket 73 with the contact arms thereof positioned within the path of travel of a portion of the punch and die assembly to synchronize, through non-illustrated control circuit means connected thereto, the operation of the apparatus with the operation of the punch and die and tapping assemblies.

A misfeed detector is included in the hereindisclosed preferred embodiment of the invention to detect any jamming in the transfer of cover guides by the slidable transfer cam member and to immediately discontinue operation of the apparatus and the tapping and punch and die assemblies in response thereto. The detector includes a microswitch 46 mounted as shown in FIGS. 1 and 2 upon connecting rod support member 47, with the roller contact actuator 48 of the switch riding on the surface of the connecting rod. Microswitch actuating grooves 51 and 52 are formed in the surface of the connecting rod in the path of travel thereover of the switch contact actuator 46 and function, through actuation of the switch contacts every time the contact actuator passes thereover, to alternately activate and deactivate a time delay relay control circuit connected thereto which circuit, if not deactivated in a predetermined period of time (the time it normally takes connecting rod 18 to travel the distance between the grooves) after activation thereof, will discontinue operation of the apparatus and the punch and die and tapping assemblies. Thus, should a cover guide become jammed between the adjacent walls of the mounting and guide block 14 and the slidable transfer cam member 16, thereby preventing further movement of the latter and connecting rod 18, actuation of the microswitch to deactivate the time delay relay circuit within the predetermined time would not occur, whereupon all disclosed operations would be automatically discontinued.

The operation of the apparatus and attendant progression of a cover guide from the punch and die therethrough will now be described in detail with the letters A, B, C and D inserted in the drawings and referred to in this description for convenient identification of the significant positions assumed by a cover guide during the course of such progression. For purposes of this description it will be assumed that operation of the apparatus and the punch and die has been commenced with resultant positioning of cover guides at positions A, B, C and D.

Upon the completion of a forming step within the die 6 of the punch and die, the cover guide at position A of FIGS. 1, 2 and 4 is ejected therefrom by a blast of compressed air from discharge nozzle 9 against lip portion 1 to the area above bevelled guide block 12 wherefrom it travels, under the combined effects of the force of gravity, a blast of compressed air from discharge nozzle 67, and the vertical wall 10 of guide 27, over cam surface 20 to nest in the vertical position B of FIGS. 1, 2 and 4.

A reciprocatory cycle of the slidable cam transfer member 14 is now commenced through connecting lever 19 by automatic actuation of the double-acting air cylinder assembly 13, whereupon the transfer member is moved in the direction of the arrow in FIG. 1 to the position indicated by the location of pawl pairs 35 and 36 in FIG. 4. Such movement will not result in movement of the cover guides already at positions B, C or D in that the bevelled edges 42 of the spring-loaded pawl pairs 35 and 36 will enable the latter to merely ride over the guides to assume the positions depicted in FIG. 4. The holding action of central guide and mounting block pawl 41 and drag pad 75 further insures the location and maintenance of the cover guide at position C. This movement of the transfer member and connected pawl pairs 35 and 36 will, however, function to properly position the pawl pairs as shown in FIG. 4 to transfer the cover guides at positions B and C therefrom upon the return of the transfer member. Such return movement is now affected, again by automatic actuation of the air cylinder assembly, whereupon the transfer member is returned to the position of FIG. 1 with attendant movement of pawl pairs 35 and 36 and the cover guides gripped thereby from left to right in FIG. 4. Thus, the cover guide at position B is transferred to position C by the gripping action of pawl pair 35 thereon, while the cover guide at position C transferred to position D by the gripping action of pawl pair 36 thereon. Central mounting and guide block pawl 41 will, of course, present no obstacle to the transfer of the cover guide from position B to position C in that the bevelled pawl surface 43 will enable the guide to merely ride over and depress this spring-loaded pawl.

Another stroke of the punch and die and tapping assembly is now effected whereby the cover guide blank at position A is formed; and the holes 63 in the cover guide just transferred to, and now maintained at, position C are threaded by the rotation of taps 42 therewithin and the attendant action of lubricating mist supply assembly 28 and vacuum chip removal assembly 32, 33. Upon the completion of this stroke, the transfer step is repeated in the above-described manner with the cover guide just formed at position A transferred to position B, the cover guide at position B transferred to position C, and the cover guide just threaded at position C transferred to position D wherefrom it may be ejected for collection in any convenient manner.

While we have described the herein-disclosed preferred embodiment of our invention in detail, it will become obvious to those skilled in this art, after reading this description, that various changes and modifications may be made therein without departing from the spirit and scope thereof. It is, therefore, intended that the matter contained in the foregoing description and annexed drawings be interpreted as illustrative only, and not in a limiting sense, when consideration is given to the appended claims.

What is claimed is:
1. In an apparatus for advancing an article,
   a mounting member for receiving the article and upon which the article is advanced,
   a transfer means mounted for sliding movement on said mounting member, said transfer means including:
   (1) a cam having a surface sloping both downward and to one side for guiding the article thereover and between said mounting member and transfer means; and
   (2) a pair of pawls vertically spaced and extending through said transfer means for advancing the article along said mounting member;
   (3) a leaf spring mounted on said transfer means and engaging said pawls for urging said pawls toward said mounting member;
   a positioning member for engaging a portion of the article advanced over said cam surface;
   means for advancing the article over the cam surface of the transfer means and against the positioning member to turn the article 90 degrees and position the article at a predetermined position on the mounting member; and
   means for reciprocating the transfer means to reciprocate said pawls whereupon said pawls are moved against the leaf spring and over the article and thereafter said pawls are moved in the opposite direction to contact the article and advance the article away from said positioning member and along the mounting member.

2. In a device for orienting, positioning and transferring articles:
   a stationary article mounting block,
   means included in the block whereby articles may be mounted and moved thereon through at least first and second positions,
   a slidable transfer member cooperatively associated therewith and located adjacent thereto,
   a cam surface formed in said transfer member facing an adjacent surface of said mounting block whereby articles may be oriented and positioned thereby on said mounting block in the first of said positions, and
   said slidable transfer member further includes spring-loaded pawls mounted therein and facing the adjacent surface of the mounting block whereby articles positioned on said mounting block in the first of said positions may be gripped by said pawls and transferred thereby to the second of said positions upon movement of the transfer member relative to the mounting block.

No references cited.

RICHARD H. EANES, JR., *Primary Examiner.*